United States Patent [19]
Wentworth

[11] Patent Number: 5,305,487
[45] Date of Patent: Apr. 26, 1994

[54] SPHERICAL ROD END WITH FLEXIBLE CONDUIT

[75] Inventor: Robert J. Wentworth, Farmington Hills, Mich.

[73] Assignee: Belanger, Inc., Northville, Mich.

[21] Appl. No.: 960,134

[22] Filed: Oct. 13, 1992

[51] Int. Cl.⁵ ............................................ B60S 3/04
[52] U.S. Cl. .................... 15/97.3; 15/DIG. 2; 74/605; 184/6.5; 184/104.1; 384/315
[58] Field of Search ............... 15/53.1, 53.2, 53.3, 15/53.4, 97.3, DIG. 2; 184/6.5, 104.1; 384/97, 98, 315, 398; 74/605

[56] References Cited

U.S. PATENT DOCUMENTS 2,008,527  7/1935  Warren ............................... 384/315
4,096,600  6/1978  Belanger .............................. 15/97.1

OTHER PUBLICATIONS

"Spherical Rod Ends", 1988 SAE Handbook, vol. 2, p. 14.12.

*Primary Examiner*—Edward L. Roberts
*Attorney, Agent, or Firm*—Brooks & Kushman

[57] ABSTRACT

A spherical rod end with a flexible fluid conduit is disclosed. The spherical rod end includes a housing having an outer region and a spherical inner race surface, with a fluid passageway extending between the outer region and the inner race surface. A spherical ball is included in the spherical rod end which pivotally mounts within the inner race surface. An elongated flexible fluid conduit, having an end adapted to be coupled to a source of pressurized water and an opposite end in fluid communication with the housing fluid passageway. Water from the pressurized source is used to lubricate the interface between the inner race surface and the spherical ball.

7 Claims, 1 Drawing Sheet

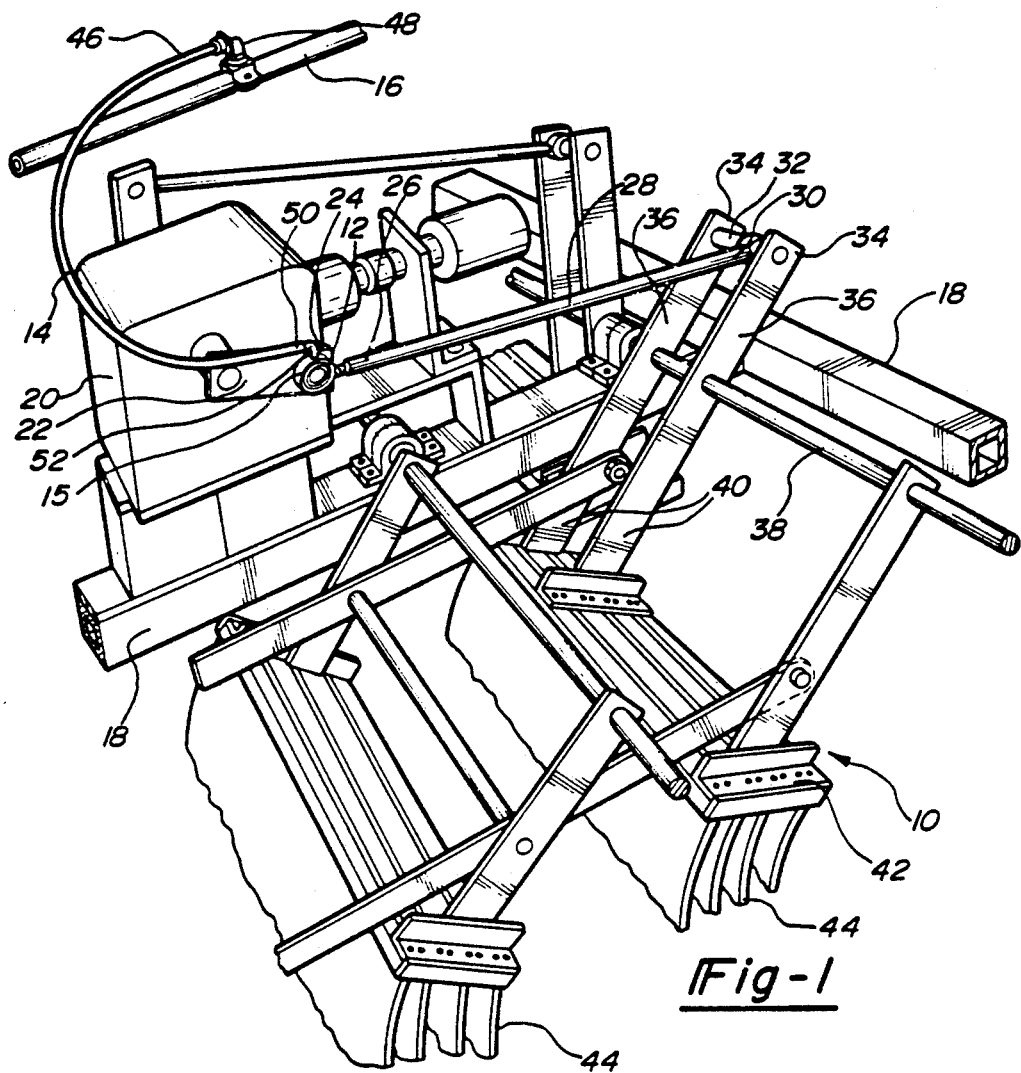
Fig-1
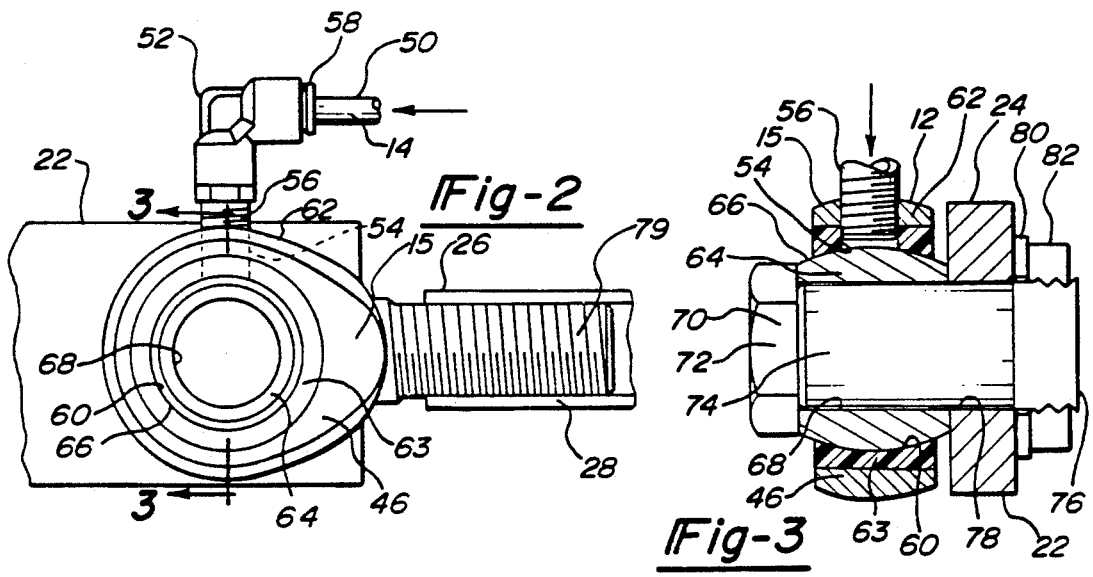
Fig-2
Fig-3

SPHERICAL ROD END WITH FLEXIBLE CONDUIT

TECHNICAL FIELD

The present invention relates generally to spherical rod ends and more particularly, to lubricated rod ends.

INCORPORATION BY REFERENCE

This application incorporates by reference my U.S. Pat. No. 4,096,600, entitled Friction Curtain Apparatus, which issued Jun. 27, 1978.

BACKGROUND ART

Spherical rod ends are often used when rotary motion is to be converted into reciprocating motion. One example is with a friction curtain apparatus of a vehicle wash, such as that disclosed in U.S. Pat. No. 4,096,600. A motor is used to rotate a crank arm which is connected by a spherical rod end to a connecting rod whose other end is attached to the first ends of a pair of pivot arms. The pivot arms, in turn, are pivotally attached along their mid-lengths to a transverse rod or axis with the far ends of the pivot arms supporting a rack which has friction curtains suspended therefrom. When the crank arm rotates through 360°, the ends of the pivot arms reciprocate forward and backward with the curtains imparting a sweeping, scrubbing or flicking motion to clean a vehicle passing through the vehicle wash.

The crank arm is affixed to a spherical ball on the spherical rod end with the ball pivoting within a race surface of a housing. Pivoting of the ball relative to the race surface may cause friction therebetween and annoying squeaking noise. To reduce friction and the associated noise problem, lubrication is provided to the spherical rod end.

Spherical rod ends are available with grease fittings which pass grease from a grease gun to the interface between the race surface and the ball. However, several problems exist if this type of lubrication is used with a friction curtain apparatus in a vehicle wash. First, only a small quantity of grease can be stored in the spherical rod end. Therefore, it is necessary that the grease fitting be repeatedly filled with grease. Also, as a vehicle wash is typically a soapy environment, the grease is easily broken down and lost. The motor and its crank arm are generally located in a position high above the floor, consequently it is inconvenient to reach the fitting. Further, it is necessary to stop the vehicle wash while the greasing operation is being performed, thereby increasing the downtime of the vehicle wash.

But, using grease within a grease fitting and spherical rod end may result in grease dripping upon the vehicle passing thereunder. The curtains may then actually rub grease into the vehicle, hindering the vehicle cleaning process. Therefore, care must be taken to provide only limited amounts of grease to the spherical rod end.

To avoid the above problems, an alternative lubrication method has been used which includes spraying water externally upon the spherical rod end as the crank arm rotates. A problem associated with this method is that spray striking the spherical rod end spreads over adjacent components of the car wash, which are generally metallic, increasing the rate at which these components rust and reducing their working lives. Also, if the spray is not accurately directed, adequate amounts of water may not be received between the ball-race surface interface with the spherical rod end thereby increasing the possibility of friction and noise because of the lack of lubrication.

The present invention addresses the aforementioned problems.

SUMMARY OF THE INVENTION

The present invention includes a spherical rod end for pivotally interconnecting first and second members. The rod end includes a housing having a central opening extending therethrough defining a spherical inner race surface, means, such as a threaded rod, for affixing the housing to the first member, which may be an elongated rod, and a fluid passageway extending between the inner race surface and the outer region of the housing. The rod end also includes a ball sized to fit within and which pivotally cooperates with the housing inner race surface. The ball also has means, such as a cylindrical aperture, for affixing to the second member, which may be a crank arm.

Further included in the spherical rod end of the present invention is an elongate flexible fluid conduit which has a first end adapted to be coupled to a source of pressurized water and an opposite second end which is fluid communication with the housing fluid passageway. The conduit has sufficient length to enable the housing to cyclically move relative to the first end of the conduit when the first end is affixed to the source of pressurized water without fatiguing the conduit. Further, the spherical rod end preferably has a fluid coupling connecting the conduit to the housing fluid passageway.

The housing of the spherical rod end may further include an annular inner portion, in which the inner race surface is defined, made of a polymer or plastic.

Accordingly, it is an object of the present invention to provide a lubricated spherical rod end for a vehicle wash which has a flexible fluid conduit connectable to a source of pressurized water and also in fluid communication with a fluid passageway extending between an outer region of a housing and an inner race surface formed in the housing which cooperatively and pivotally supports a spherical ball, wherein water provides lubrication between the spherical ball and the race surface.

Another object is to provide a lubricated spherical rod end for a vehicle wash which does not use grease as a lubricant.

Another object is to provide lubrication to a spherical rod end in a manner which reduces excessive spray of water over components located atop a car wash.

A further object is to provide a lubricated spherical rod end which has water fed directly to the interface between a spherical ball and race surface thereby insuring adequate lubrication between the ball and the surface.

Other objects, features and advantages will become more readily apparent from the following description and accompanying sheet of drawings.

BRIEF DESCRIPTION OF THE DRAWINGS

FIG. 1 is a fragmentary perspective view of a friction curtain apparatus having a spherical rod end with a flexible fluid conduit made in accordance with the present invention;

FIG. 2 is an enlarged, fragmentary, partial cut-away side view of the spherical rod end shown with a bolt removed for clarity; and FIG. 3 is a fragmentary sectional view taken along line 3—3 of FIG. 2 of the spherical rod end including the bolt omitted in FIG. 2.

BEST MODE FOR CARRYING OUT THE INVENTION

FIG. 1 shows a fragmentary perspective view of a friction curtain apparatus 10 which includes a spherical rod end 12 having a flexible fluid conduit 14 and a housing 15. The conduit 14 is adapted to fluidly connect with a source 16 of pressurized water. Water is transported from source 16 through conduit 14 to housing 15 to provide lubrication to spherical rod end 12 during the operation of friction curtain apparatus 10.

The components and assembly of friction curtain apparatus 10, which are supported by a frame member 18 of a vehicle wash, will now be described. In the preferred embodiment, a motor 20 rotates a crank arm 22 in a planar circular path. A distal end 24 of crank arm 22 is connected by spherical rod end 12 to a first end 26 of a connecting rod 28.

Connecting rod 28 has a second end 30 which is pivotally connected by a cross bar 32 to the first ends 34 of a pair of pivot arms 36. Pivot arms 36 pivot about a transverse axis 38 which is also supported by frame 18. Pivot arms 36 each have a second end 40 which cooperate to support a rack 42. A plurality of friction curtains 44 are suspended from rack 42.

In operation, motor 20 rotates crank arm 22 with distal end 24, spherical rod end 12 and first end 26 of connecting rod 28 translating through a circular path. In response, second end 30 of connecting rod 28 and first ends 34 of pivot arms 36 are reciprocated in an arcuate path about transverse axis 38. This results in second ends 40 of pivot arms 36 and rack 42 also moving in an arcuate path about transverse axis 38. Consequently, friction curtains 44 move back and forth across a vehicle (not shown) to clean its exterior. For more details on the operation of friction curtain apparatus 10, U.S. Pat. No. 4,096,600, which has been incorporated into the present application, may be consulted.

Looking to FIG. 1, flexible fluid conduit 14 connects between source 16 of pressurized water and housing 15. Conduit 14 includes a first end 46 adapted to be fluidly coupled to source 16 by an adapter 48. Similarly, conduit 14 has an opposite second end 50 adapted to fluidly communicate with housing 15 by way of a fluid coupling 52. Conduit 14 should be of sufficient length to enable the housing 15 to cyclically move relative to the first end 46 of the conduit 14 when affixed to source 16 of pressurized water without fatiguing conduit 14.

FIGS. 2 and 3 better illustrate fluid coupling 52 connecting between conduit 14 and a fluid passageway 54 located in housing 15. In the preferred embodiment, fluid coupling 52 is L-shaped having a first end 56 which has male threads thereon which are threadingly received within female threads located along the inner periphery of fluid passageway 54. Preferably, intermediate the male and female threads is a plastic sealing tape (not shown) which enhances the fluid sealing therebetween. A second end 58 on fluid coupling 52 sealingly receives second end 50 of flexible fluid conduit 14. Conduit 14 is preferably made of a flexible plastic material.

FIGS. 2 and 3 also illustrate in more detail the construction of housing 15 and its connection to fluid conduit 14, crank arm 22 and connecting rod 28. FIG. 3 is shown with a bolted connection connecting spherical rod end 12 to the distal end 24 of crank arm 22. For clarity, FIG. 2 is shown without the bolted connection.

Spherical rod end 12 includes housing 15 which has a central opening formed in a circumscribing outer region or portion 62 thereof and defining a spherical inner race surface 60 on an inner region or portion 63 thereof. Fluid passageway 54 extends from the inner race surface 60 through the inner region 63 and the outer region 62 of housing 15. Preferably, the inner region 63 defines the inner race surface. Inner region 63 may be made of any polymer suitable for use with spherical rod end and the remainder of housing 15 may be made of a stainless steel. Inner region 63 is maintained within the remainder of housing 15 by an interference fit.

A spherical ball 64, preferably also made of stainless steel, has a spherical exterior surface 66 which pivotally cooperates with the inner race surface 60. Ball 64 also has an inner cylindrical surface forming an aperture 68.

As shown in FIG. 3, a bolted connection may be used to fasten ball 64 to distal end 24 of crank arm 22. A bolt 70, having a head 72, a shank 74, and a threaded end 76, passes through aperture 68 of ball 64 and an aperture 78 in distal end 24. A washer 80 and a threaded nut 82, are used to clampingly secure bolt 70 to spherical ball 64 and crank 22.

Housing 15 further includes a threaded shaft portion 79 which is retained in a threaded hollow portion of first end 26 of connecting rod 28.

Water from a pressurized source 16 is continuously fed through flexible fluid conduit 14 to fluid passageway 54. The water reaches the interface between spherical exterior surface 66 of ball 64 and inner race surface 60 of housing 15 to provide lubrication therebetween. The lubrication is necessary as the ball 64 pivots within race surface 60 during operation of the friction curtain apparatus 10. This method of lubrication does not use grease and insures adequate lubrication of spherical rod end 12 without water being sprayed over adjacent components of the vehicle wash.

While the foregoing specification of this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

For example, connecting rod 28 and threaded shaft portion 79 may be hollow and serve as a passageway to fluidly connect fluid passageway 54 with fluid coupling 52 and second end 50 of flexible fluid conduit 14. Coupling 52 could be installed mid-length along connecting rod 28. Further, water could then be used to also lubricate the moving joint formed between second end 30 of connection rod 28 and cross-bar 32.

What is claimed is:

1. A cyclically movable joint assembly for a vehicle wash which pivotally interconnects a first and a second member, the joint assembly comprising:

a housing having an inner region and an outer region, said inner region having a central opening extending therethrough and defining a spherical inner race surface, means for affixing the housing to the first member, and a fluid passageway extending from the inner race surface through to the outer region of the housing;

a ball sized to fit within and free to rotatably cooperate with the housing spherical inner race surface and having means for affixing the ball to the second member; and an elongated flexible fluid conduit having a first end adapted to be coupled to a source of pressurized fluid and a second end in fluid communication with the housing fluid passageway, the conduit being of sufficient length to enable the conduit to flex as the ball and housing cyclically move relative to the conduit first end such that the conduit does not fatigue.

2. The joint assembly of claim 1 further comprising a fluid coupling attaching the second end of the conduit to the fluid passageway.

3. The joint assembly of claim 1 wherein the inner region of the housing further includes an annular inner portion formed of a polymer in which the inner race surface is defined.

4. The joint assembly of claim 1 wherein the means for affixing the housing to the first member includes a threaded region integrally formed as part of the housing.

5. The joint assembly of claim 1 wherein the means for affixing the ball to the second member includes an aperture extending through the ball.

6. A friction curtain apparatus for a vehicle wash having a fluid supply and frame through which vehicles pass, the curtain apparatus comprising:

a power actuated drive mechanism supported by the frame and having a rotating crank arm;

a connecting rod having a first end and a second end;

a pivot arm having a first and second end and a mid-section therebetween connected to the connecting rod, the pivot arm mid-section being pivotally connected to the frame;

a rack connected to the second end of the pivot arm and supporting a plurality of friction curtains suspended therefrom; and a spherical rod end assembly pivotably connecting the connecting rod first end to the crank arm, the rod end assembly having;

a housing provided with a central opening extending therethrough defining a spherical inner race surface, a threaded shaft connecting between the housing and to the first end of the connecting rod, a fluid passageway extending between the inner race surface and an outer region of the housing;

a ball sized to fit within and free to rotate relative to the housing spherical inner race surface, the ball being affixed to the crank arm; and an elongated flexible fluid conduit having an end adapted to be coupled to a source of pressurized fluid and an opposite end which is in fluid communication with the housing fluid passageway, the conduit having sufficient length to enable conduit to flex as the ball housing to cyclically move as the crank arm rotates so that the conduit does not fatigue.

7. The friction curtain apparatus of claim 6 further comprising a fluid coupling connecting the opposite end of the conduit to the housing fluid passageway.

* * * * *